US008504459B1

(12) United States Patent
Cui et al.

(10) Patent No.: US 8,504,459 B1
(45) Date of Patent: Aug. 6, 2013

(54) METHOD, SYSTEM, AND COMPUTER PROGRAM PRODUCT FOR GRADING A COLLATERALIZED MORTGAGE OBLIGATION OR OTHER ASSET-BACKED SECURITY

(75) Inventors: Jianyuan Cui, Oakton, VA (US);
Marian Gora, Boca Raton, FL (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 311 days.

(21) Appl. No.: 12/429,640

(22) Filed: Apr. 24, 2009

Related U.S. Application Data

(62) Division of application No. 11/365,526, filed on Mar. 2, 2006, now Pat. No. 7,734,523.

(60) Provisional application No. 60/657,706, filed on Mar. 3, 2005.

(51) Int. Cl.
*G06Q 40/00* (2012.01)

(52) U.S. Cl.
USPC .......................................... 705/36 R; 705/35

(58) Field of Classification Search
USPC ...................................................... 705/36 R
See application file for complete search history.

(56) References Cited

U.S. PATENT DOCUMENTS

| | | | | |
|---|---|---|---|---|
| 7,469,225 | B1 * | 12/2008 | Perrucci .......................... | 705/35 |
| 2002/0046144 | A1 * | 4/2002 | Graff ............................... | 705/36 |
| 2006/0095355 | A1 * | 5/2006 | Mayers et al. .................. | 705/35 |
| 2006/0112005 | A1 * | 5/2006 | Priore ............................. | 705/39 |
| 2007/0078744 | A1 * | 4/2007 | Koss et al. .................. | 705/36 R |
| 2009/0171859 | A1 * | 7/2009 | Priore .......................... | 705/36 R |

OTHER PUBLICATIONS

Childs, Paul; Steven Ott and Timothy Riddiough; The Journal of Financial and Quantitative Analysis; vol. 31 No. 4; Dec. 1996 pp. 581, "The Pricing of Multiclass Commercial Mortgage-Backed Securities".*

Freddie Mac Offering Circular, Jun. 1, 2003.

* cited by examiner

*Primary Examiner* — Kirsten Apple
(74) *Attorney, Agent, or Firm* — Oblon, Spivak, McClelland, Maier & Neustadt, L.L.P.

(57) ABSTRACT

The invention relates to a method, system and computer program product for grading asset-backed securities by assigning a relative grade, including one or more of a prepayment risk component and a complexity component, which may take into account one or more of weighted average life, volatility of weighted average life at moderate and stressed yield curve shifts, and complexity, in the absence of price information.

18 Claims, 14 Drawing Sheets

Fig. 6

| | BASIS POINT SHIFT | | | | | | | | | GRADING | |
|---|---|---|---|---|---|---|---|---|---|---|---|
| | MED BLOOMBRG PSA | | 311 | 148 | 1476 | 107 | 2059 | | | | |
| REMIC CLASS | PRINCIPAL TYPE | INTEREST TYPE | PRINCIPAL BALANCES | 0 | 100 | -100 | 300 | -300 | WAL1M | WAL1S | PRE-PAYMENT | COMPLEX-ITY |
| | | | | WEIGHTED AVERAGE LIFE | | | | | | | | |
| CX | NSJ/TAC | FIX | 155.50 | 2.48 | 3.90 | 0.79 | 5.64 | 0.61 | 63 | 34 | (2.5,B,B) | (X) |
| ZD | NSJ/TAC | FIX/Z | 0.05 | 3.63 | 11.38 | 0.96 | 13.38 | 0.79 | 144 | 58 | (3.6,C,C) | (X) |
| ZC | NSJ/SUP | FIX/Z | 46.66 | 0.39 | 6.62 | 0.12 | 16.64 | 0.09 | 828 | 704 | (0.4,E,E) | (X) |
| FR | NSJ/SUP | FLT | 65.28 | 1.63 | 20.72 | 0.41 | 24.31 | 0.32 | 622 | 245 | (1.6,E,E) | (X) |
| FY | NSJ/SUP | FLT | 11.63 | 1.63 | 20.72 | 0.41 | 24.31 | 0.32 | 622 | 245 | (1.6,E,E) | (X) |
| PO | NSJ/SUP | PO | 11.59 | 1.63 | 20.72 | 0.41 | 24.31 | 0.32 | 622 | 245 | (1.6,E,E) | (X) |
| SB | NSJ/SUP | INV | 2.94 | 1.63 | 20.72 | 0.41 | 24.31 | 0.32 | 622 | 245 | (1.6,E,E) | (X) |
| SQ | NSJ/SUP | INV | 11.59 | 1.63 | 20.72 | 0.41 | 24.31 | 0.32 | 622 | 245 | (1.6,E,E) | (X) |
| ZY | NSJ/SUP | FIX/Z | 0.05 | 4.13 | 29.54 | 0.63 | 29.54 | 0.46 | 351 | 118 | (4.1,E,E) | (X) |
| BF | NSJ/SUP | FLT | 20.00 | 2.30 | 7.56 | 0.68 | 8.89 | 0.52 | 150 | 61 | (2.3,C,D) | (X) |
| BS | NSJ/SUP | INV | 8.00 | 2.30 | 7.56 | 0.68 | 8.89 | 0.52 | 150 | 61 | (2.3,C,D) | (X) |
| FN | NSJ/SUP | FLT | 20.00 | 2.30 | 7.56 | 0.68 | 8.89 | 0.52 | 150 | 61 | (2.3,C,D) | (X) |
| SN | NSJ/SUP | INV | 0.50 | 2.30 | 7.56 | 0.68 | 8.89 | 0.52 | 150 | 61 | (2.3,C,D) | (X) |
| SX | NSJ/SUP | INV | 7.60 | 2.30 | 7.56 | 0.68 | 8.89 | 0.52 | 150 | 61 | (2.3,C,D) | (X) |
| TX | NSJ/SUP | INV | 1.90 | 2.30 | 7.56 | 0.68 | 8.89 | 0.52 | 150 | 61 | (2.3,C,D) | (X) |
| ZK | NSJ/SUP | FIX/Z | 0.05 | 4.12 | 18.38 | 0.96 | 17.46 | 0.79 | 212 | 67 | (4.1,D,D) | (X) |
| CZ | NSJ/SUP | FIX/Z | 11.61 | 0.39 | 11.88 | 0.12 | 21.62 | 0.09 | 1,499 | 916 | (0.4,E,E) | (X) |
| LF | NSJ/SUP | FLT | 5.17 | 0.87 | 25.90 | 0.28 | 27.61 | 0.21 | 1,481 | 528 | (0.9,E,E) | (X) |
| LS | NSJ/SUP | INV | 2.59 | 0.87 | 25.90 | 0.28 | 27.61 | 0.21 | 1,481 | 528 | (0.9,E,E) | (X) |
| WZ | NSJ/SUP | FIX/Z | 0.05 | 1.04 | 29.46 | 0.38 | 29.53 | 0.29 | 1,396 | 468 | (1,E,E) | (X) |
| COLLAT | | | | 5.15 | 8.81 | 1.23 | 10.48 | 0.85 | 72 | 31 | (5.1,B,B) | (X) |

COLLATERAL PROFILE REPORT

Date 5/17/2004    Profile FHR2778G1

General Statistics

| | |
|---|---|
| Factor Date: | 5/1/2004 |
| Issuer: | FHLM |
| Term: | 30 |
| Compon: | 5 |
| CurrentUPB(Millions): | 1,103 |
| Pool Count: | 211 |
| Active Loan Count: | 5,481 |
| WAC: | 5.56 |
| WARM: | 353 |
| WALA: | 5 |
| 1-Month CPR: | 10.28 |
| AOLS: | 202.713 |
| Weighted AOLS: | 209.352 |
| Simple AOLS: | 184.415 |
| WAOLTV: | 72 |
| WAOCS: | 724 |

Disclosure Integrity

| | UPB% |
|---|---|
| Disclosure Element | 100% |
| 1-Month CPR | 100% |
| AOLS | 100% |
| Credit Score Quartiles | 100% |
| Current Services | 100% |
| GEOs | 100% |
| Loan Age Quartiles | 100% |
| Loan Count | 100% |
| Loan Size Quartiles | 100% |
| Mortgage Status (Current) | 100% |
| Mortgage Status (Earliest) | 100% |
| Note Rate Quartiles | 100% |
| Original LTV Quartiles | 100% |
| WAOCS | 100% |
| WAOLTV | 100% |

Collateral Break Down

| Largest 5 Contributing Sdlers | UPB% |
|---|---|
| Norwest/Wells Fargo | 43% |
| Empty/Unknown | 12% |
| Principal Residential | 11% |
| US Bank | 7% |
| Standard Fed/ABN AMRO | 6% |

| Largest 5 Contributing States | UPB% |
|---|---|
| CA | 19% |
| IL | 5% |
| MN | 5% |
| FL | 5% |
| VA | 4% |

| Largest 5 Contributing Servicers | UPB% |
|---|---|
| WELLSFARGOHOMEMORTGA | 44% |
| PRINCIPALRESIDENTIAL | 12% |
| USBANKNA | 7% |
| ABNAMROMTGEGROUPJNC | 7% |
| CHASEMANHATTANMTGECO | 5% |

*Fig. 7A*

Loan Level Quartile Statistics Extrapolated from Pool Level Quartile Disclosure

|  | Min | 1st Quartile | 2nd Quartile | 3rd Quartile | Max |
|---|---|---|---|---|---|
| Credit Score | 333 | 685 | 730 | 764 | 842 |
| Original LTV | 6 | 63 | 76 | 81 | 100 |
| Loan Age | 1 | 2 | 4 | 8 | 104 |
| Loan Note Rate | 5.25 | 5.46 | 5.55 | 5.75 | 6.75 |
| Loan Size | 16,000 | 171,491 | 223,181 | 284,515 | 642,000 |

Pool Level Disclosure Quartile Statistics

|  | Min | 1st Quartile | 2nd Quartile | 3rd Quartile | Max |
|---|---|---|---|---|---|
| Pool 1-Month CPR | 0 | 0.51 | 6.72 | 10.05 | 98.34 |
| Pool Credit Score | 658 | 720 | 724 | 729 | 778 |
| Pool LTV | 60 | 70 | 71 | 74 | 99 |
| Pool WALA | 1 | 1 | 2 | 8 | 71 |
| Pool WAC | 5.25 | 5.46 | 5.55 | 5.68 | 6.21 |
| Pool AOLS | 70,618 | 184,852 | 218,442 | 231,115 | 291,160 |

*Fig. 7B*

Current Mortgage Statistics

| Occupancy | UPB% | | Loan Purpose | UPB% | | Property Type | UPB% |
|---|---|---|---|---|---|---|---|
| Owner Occupied | 95% | | Purchase | 32% | | 1 Unit Properties | 98% |
| 2nd Home | 3% | | Refinance | 68% | | 2 to 4 Unit Properties | 2% |
| Investment Property | 1% | | Unknown Purpose | 0% | | Unknown Number of Units | 0% |
| Unknown Occupancy | 0% | | | | | | |

Earliest Available Mortgage Statistics

| Occupancy | UPB% | | Loan Purpose | UPB% | | Property Type | UPB% |
|---|---|---|---|---|---|---|---|
| Owner Occupied | 95% | | Purchase | 32% | | 1 Unit Properties | 98% |
| 2nd Home | 3% | | Refinance | 68% | | 2 to 4 Unit Properties | 2% |
| Investment Property | 1% | | Unknown Purpose | 0% | | Unknown Number of Units | 0% |
| Unknown Occupancy | 0% | | | | | | |

*Fig. 7C*

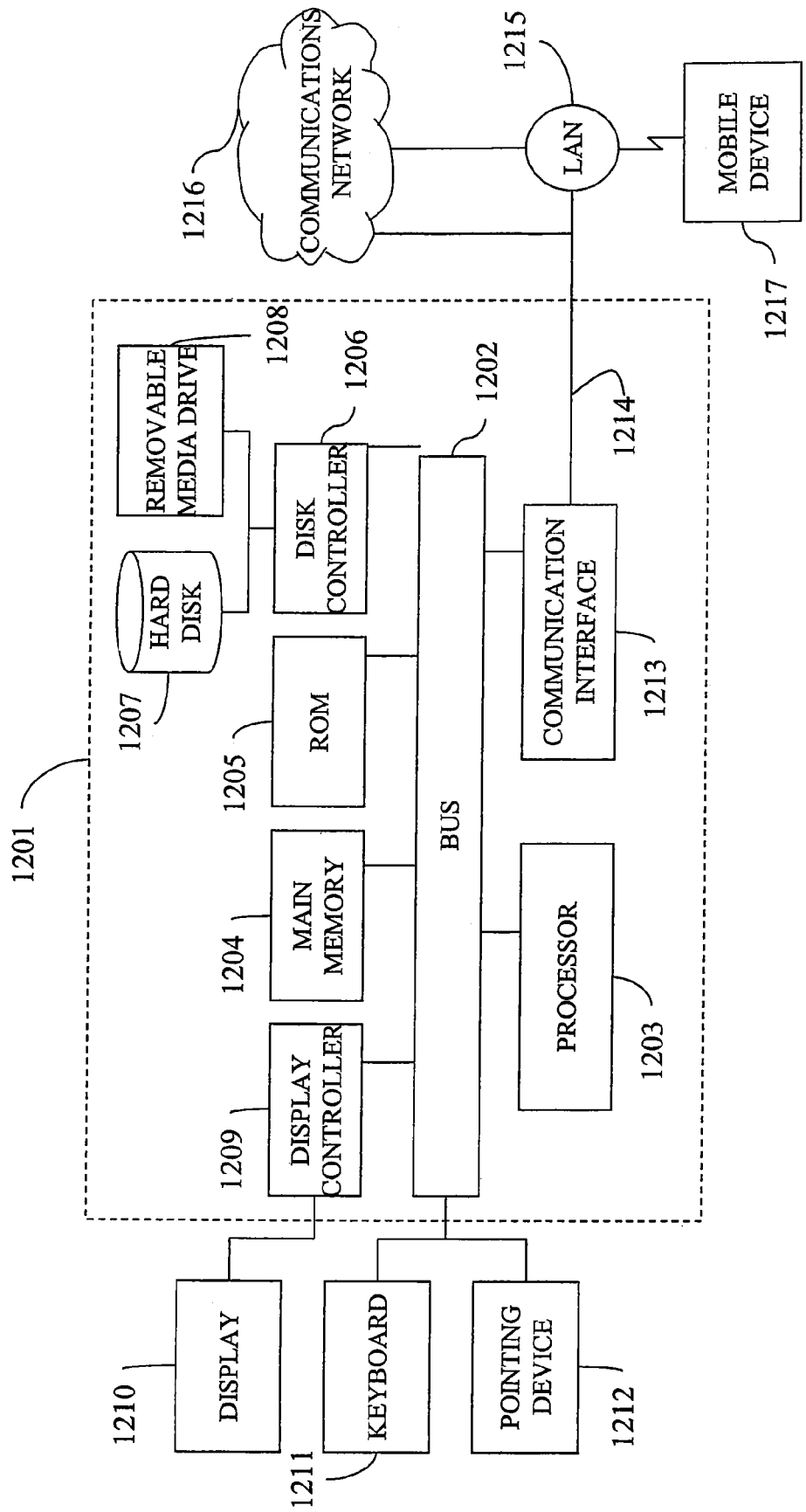

METHOD, SYSTEM, AND COMPUTER PROGRAM PRODUCT FOR GRADING A COLLATERALIZED MORTGAGE OBLIGATION OR OTHER ASSET-BACKED SECURITY

CROSS REFERENCE TO RELATED APPLICATION

The present application claims the benefit of the earlier filing date of U.S. Provisional Application 60/657,706 filed on Mar. 3, 2005 which is incorporated herein by reference in its entirety including all attachments, drawings and information presented therein.

BACKGROUND OF THE INVENTION

1. Field of the Invention

The invention relates to a method, system and computer program product for grading asset-backed securities including collateralized mortgage obligations by assigning a relative grade, including a prepayment risk component and a complexity component, which may take into account one or more of weighted average life, volatility of weighted average life at moderate and stressed yield curve shifts, and complexity, in the absence of price information.

2. Description of the Related Art

Asset-backed securities are an important financing technique that permits illiquid assets such as home mortgages, credit card debt or automobile loans to be pooled in an economical and practical manner. The underlying assets are pooled to secure debt, and the resulting pools may be bought and sold among investors and financial institutions. The principal and interest streams associated with the pools can also be bought and sold, and transferred to other entities. Collateralized mortgage obligations (CMOs) are mortgage-backed securities which allow cash flows to be directed so that different classes of securities with different maturities and coupons can be created. These classes of securities are also referred to as bonds or tranches.

Mortgage-backed securities differ from other asset-backed securities in two important respects. First, most mortgages are subject to prepayment at the option of the obligor, so there is a risk that a bond may not be outstanding as long as an investor anticipates due to prepayment of the mortgages that underlie the mortgage-backed security. Second, the majority of mortgage-backed securities have the advantage of reduced credit risk through guarantees provided by the U.S. government (through Ginnie Mae) or by government sponsored enterprises such as Fannie Mae and Freddie Mac ("GSEs").

In comparison to other asset-backed securities, mortgage-backed securities have disadvantages, such as substantially longer maturities. For example, a pool of thirty year mortgages has a much longer maturity than a pool of five year automobile loans.

As is the case with almost all asset-backed securities, mortgage-backed securities such as CMOs are sensitive to interest rate changes. The interest rate risk associated with CMOs is reflected in one measure by prepayment speed. As interest rates fall, it becomes more likely that an individual mortgagor will refinance. Refinancing cuts off the payment stream that was associated with the original mortgage. The resulting interruption of an investor's income stream expectations significantly affects the value of the CMO.

It is therefore important to quantify and distinguish prepayment risk as a separate component of the quality and value of any asset-backed security, especially a CMO. The financial markets have developed methods for quantifying prepayment risk and prepayment expectations in CMOs. Existing grading systems may be based upon empirical data. Conventional, commercially available or proprietary grading systems, such as those available through Bloomberg (e.g., GRADE, C.FLUX and FFIEC), may rely on a price input, i.e., the price an investor is willing to pay for the CMO. While price may be an appropriate input for a market-based measure of a CMO's sensitivity to changes in the market (e.g., interest rate changes), market prices are not readily available for many CMOs because, in many cases, they are not widely traded. Moreover, the price of a CMO may be affected by the liquidity of the underlying assets or the marketing effectiveness of the investor or financial institution holding the security.

Prepayment assumptions for some widely traded securities are published by financial reporting services. The published prepayment assumptions are based upon market consensus and are derived from participants in the securities markets such as traders, underwriters and the financial institutions issuing the securities. The published prepayment assumptions may be based at least in part upon a comparison of current and past pricing.

Existing methods for determining prepayment risk are deficient in the richness and quality of the information they provide. Weighted average life (WAL) is one conventional measure of prepayment risk. A WAL value provides some indication to the investor of the period of maturity of the underlying security (i.e., the average time that each principal dollar in a pool is expected to be outstanding). Importantly, however, WAL does not provide investors with a measure of the sensitivity of the underlying security to changes in the market, for example, sensitivity to interest rate changes.

Likewise, some conventional methods for grading asset-backed securities such as CMOs rely on proprietary methodology for which the calculations and/or mechanics are not accessible or evident to the investor. Furthermore, such proprietary methodology may be unable to characterize a CMO with enough information for an investor to make an investment decision. These proprietary methodologies may also be based in part on difficult-to-obtain price information.

The proprietary grading systems mentioned above may be useful for bringing liquidity to the market, however proprietary systems need price information from which to derive a security's value and/or quality. True price information is difficult to obtain using proprietary systems and, for a particular security, may be determinable only upon trading of the underlying security (e.g., buying or selling the security to determine its market price). This is especially problematic for securities that are thinly traded (e.g., traded in low volume or traded on a secondary market). In the absence of richer and more detailed information regarding the pricing and/or quality of securities, investors may be faced with choosing between two CMOs with apparently equivalent grades or prepayment risks; however, the underlying assets may be substantially different with regard to their sensitivity to interest rate change and/or other changes in the market. The end effect of conventional and proprietary grading processes is to limit investor participation. Thus, the lack of grading systems that do not rely on price information makes the markets for CMOs less liquid and provide a less attractive investment alternative.

SUMMARY OF THE INVENTION

One object of the invention is to provide a method, system and computer program product for grading asset-backed securities to determine prepayment sensitivity and/or complexity.

Another object of the invention is to provide a method, system and computer program product for identifying the sensitivity of an asset-backed security to prepayment risk as reflected by WAL, calculated independently from price.

Another object of the invention is to provide a method, system and computer program product for characterizing the prepayment risk of an asset-backed security by determining WAL, WAL at a moderate shift of the yield curve, and WAL under conditions of a stressed shift of the yield curve.

It is another object of the invention to provide a method, system and computer program product for calculating WAL to characterize or grade an asset-backed security without information on the security's price.

Another object of the invention is to provide a method, system and computer program product for grading asset-backed securities through a prepayment risk assessment that includes components assignable to WAL and volatility of WAL at different yield curve shifts.

Another object of the invention is to provide a method, system and computer program product for grading the complexity of the payment stream of an asset-backed security.

The above summary addresses only selected aspects of the invention and should not be construed as a comprehensive description of all aspects and/or objects of the invention, especially not at the exclusion of the teachings in the specification, claims and figures.

BRIEF DESCRIPTION OF THE DRAWINGS

A more complete appreciation of the invention and many of the attendant advantages thereof will be readily obtained as the same becomes better understood when considered in connection with the accompanying drawings and attachments, wherein:

FIG. 6 is a chart that shows a WAL analysis for FHR 2778 Group 1 and proposed gradings for the bonds having a non-sticky jump rule in the principal payment structure;

FIG. 7 (divided into FIGS. 7A, 7B, and 7C) shows a collateral profile report for the collateral of FHR 2778 Group 1;

FIG. 12 is a block diagram of a computer system upon which an aspect of the present invention may be implemented.

DETAILED DESCRIPTION OF THE INVENTION

Figure 1:
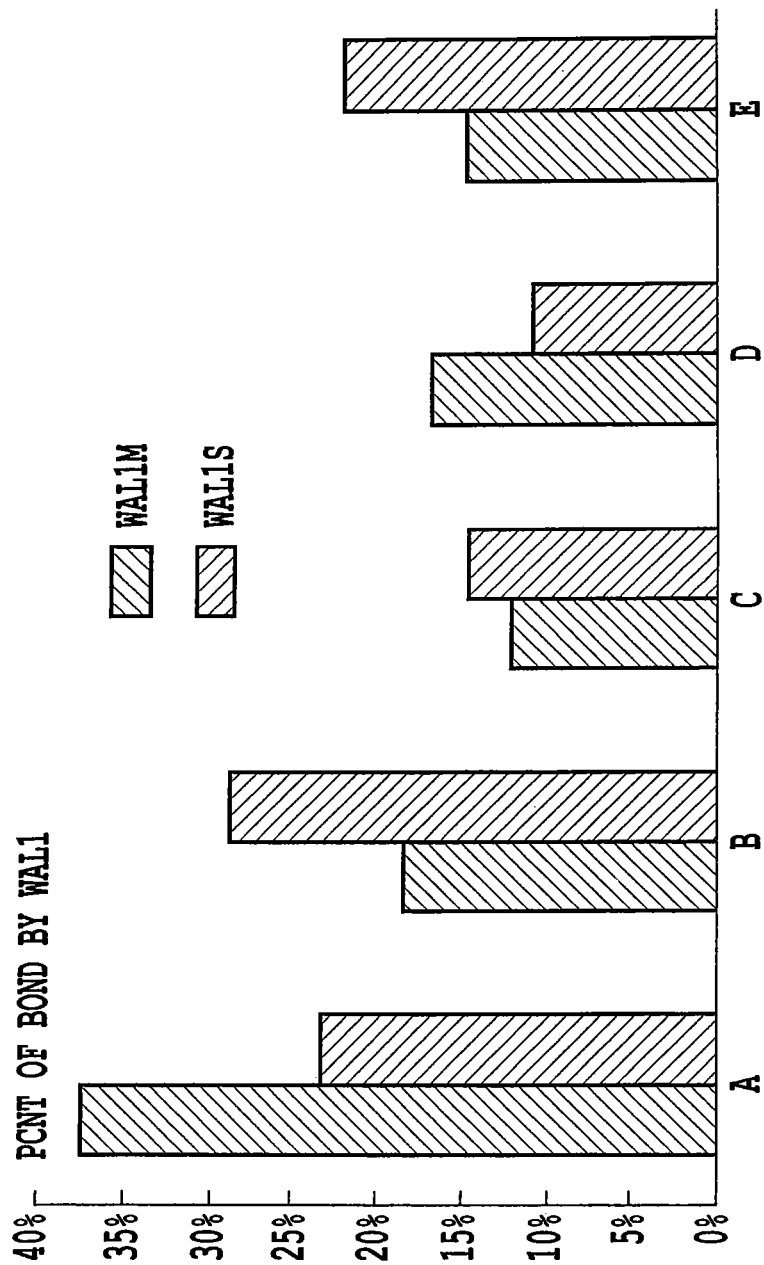
FIG. 1 is a chart showing the relative percentages of asset-backed securities and/or bonds graded into certain classes under moderate and stressed shifts of a yield curve.

In one aspect of the invention, a financial instrument, such as a bond or a CMO, is graded on the basis of at least one of two primary components: a prepayment component and a complexity component.

The prepayment component may include weighted average life (WAL) and/or derivatives of WAL such as WAL at one or more shifts of the yield curve. Some of the factors that may be included in the prepayment component in one aspect of the invention are shown below.

WAL Component Factors

WAL: weighted average life

WAL1M: change in WAL after a moderate parallel shift of the yield curve

WAL1S: change in WAL after a stressed parallel shift of the yield curve

The prepayment component may be represented by at least the three following different measures or derivations of WAL (such as WAL1M and WAL1S described herein). A first portion of the prepayment component may include a conventional WAL determination, which is available through existing sources such as those published in financial news services or may be calculated empirically. WAL may be used as a measure of pricing speed (e.g., the time to maturity of the underlying security as modified by industry consensus and as published in industry news).

WAL is commonly used in the financial industry to provide a measure of prepayment risk. WAL is calculated from principal cash flow and may include other determinants including subjective inputs such as pricing speed. Even if pricing speed is a subjective determinant of WAL, a consensus pricing speed may be obtained from financial publications such as sources provided by Bloomberg. The Bloomberg function GRADE may include such properties of pricing speed including price duration and convexity.

WAL is a well known calculation in the financial industry. WAL may be calculated by the formula presented below.

$$\frac{\sum_{t=1}^{T} t \times PRIN_t}{\sum_{t=1}^{T} PRIN_t}$$

In the formula above, PRIN is the principal payment for a number of periods for a particular bond. The number of periods is represented by t. The total duration is represented by T.

In addition to WAL, the WAL after a moderate parallel shift of the yield curve (hereinafter WAL1M) may also be used. This aspect of the prepayment component measures the change in WAL in response to a change in the underlying market for the security. For example, WAL1M is a measure of the WAL before and after a 100 basis point shift of the yield curve (e.g., ±100 bps). Thus, the WAL1M component of the prepayment component of the grading system and prepayment risk assessment method according to the present invention is reflective of the change of WAL associated with an external influence (i.e., an interest rate change).

The prepayment risk assessment and CMO grading system may include the change in WAL after a stressed parallel shift of the yield curve (WAL1S). A stressed parallel shift of the yield curve may be one where, for example, an interest rate change of 300 bps affects the market (e.g., ±300 bps).

In one of the inventive methods for prepayment risk assessment based on calculating WAL responsive to moderate and stressed yield curve shifts and/or in an inventive method for grading a CMO, the moderate and stressed yield curve shifts may be selected at yield curve shifts other than ±100 bps and ±300 bps. For example the sensitivity of the WAL to a yield curve shift can be calculated for a yield curve shift at ±50 bps. Alternatively, the moderate yield curve shift may be calculated at values of ±10, 20, 30, 40, 50, 60, 70, 80, 100, 110, 120, 130, 150, bps etc. In effect, the moderate yield curve shift can be calculated at values anywhere in the continuum of values existing between no yield curve shift and the value of the yield curve shift at stressed conditions. Likewise, the WAL under a stressed yield curve shift may be measured at other conditions besides ±300 bps. Normally, the stressed yield curve shift occurs at a greater value of bps than the moderate yield curve shift. Otherwise, the stressed yield curve shift may be determined at any value greater than the moderate yield curve shift such as, for example, ±150, 175, 200, 225, 250, 300, 325, 350, 400, 500, 1,000 bps and all values in between.

WAL may be measured using the calculations for Bloomberg median prepayment speed. WAL1M may be derived from WAL as the difference in WAL at +100 bps and −100 bps divided by the WAL multiplied by a predetermined factor. WAL1S is similarly derived using the WAL difference at +300 bps and −300 bps divided by the WAL and again multiplied by a predetermined factor.

Each of the WAL1M and WAL1S components of prepayment risk are derivatives of the underlying WAL. This derivative information provides a measure of the degree of change or degree of sensitivity of WAL based upon changes in the yield curve.

The WAL at different shifts of the yield curve is determined mathematically. Formulas for WAL1M and WAL1S are shown below for a moderate (M) yield curve shift of ±100 bps (basis points) and a stressed (S) yield curve shift of ±300 bps.

$$\frac{WAL_{+100} - WAL_{-100}}{WAL} \times 50$$

$$\frac{WAL_{+300} - WAL_{-300}}{WAL} \times \frac{50}{3}$$

As mentioned above, the WAL may be measured at different shifts of the yield curve, for example the moderate yield curve shift (WAL1M) may be at ±50 bps etc. or at any of the values described above. The same applies for the WAL at a stressed yield curve shift (WAL1S) which may be measured at a yield curve shift of more or less than ±300 bps as described above.

It is not necessary to associate a grade with a WAL determination. WAL determinations are useful in their own right for characterizing prepayment risk. The prepayment risk assessment provided by this aspect of the invention may be used as an input for grading systems other than the CMO grading system described herein.

Table 1 below provides an example of the WAL variability of bonds of 30 year and 15 year maturities at both a moderate and a stressed shifts of the yield curve. Different grades of the bonds may be identified by cluster analysis. Those bonds having a low variability may be assigned a favorable grade such as a grade "A". Low variability in a bond is representative of an investment that may be less subject to variability in value over time and/or may be subject to less pricing fluctuation over time. A very low variability may indicate that the bond has, or the underlying assets have, properties that make the bond comparable in risk and/or yield expectations to government backed bonds.

In Table 1 below each of the grades represents a portion of the continuum of the yield curve. The symbol "(" indicate that grade is exclusive of the number presented in the table whereas the symbol "[" indicates that the grade is inclusive of the number provided in the table.

TABLE 1

| Grade | WAL1M 30 yr | WAL1M 15 yr | WAL1S 30 yr | WAL1S 15 yr | Bond Examples |
|---|---|---|---|---|---|
| A | (, 50) | (, 25) | (, 15) | (, 12) | Comparable to the current discount coupon collateral |
| B | [50, 80) | [25, 40) | [15, 35) | [12, 20) | Comparable to the current coupon collateral |
| C | [80, 150) | [40, 55) | [35, 60) | [20, 25) | Sequential/TAC bonds |
| D | [150, 300) | [55, 70) | [60, 100) | [25, 35) | TAC bonds |
| E | [300,) | [70,) | [100,) | [35,) | Support bonds |

The grades shown in the table above are identified by cluster analysis. Cluster analysis allows concentration of bonds within a portfolio to be grouped according to certain grades.

The grading of the bonds may differ depending on whether the bond is graded under stressed or moderate shift of the yield curve. In many cases a bond which is graded as category "A" under a moderate shift of the yield curve may receive a different grade such as "B" or "C" when graded under a stressed shift of the yield curve. Thus it is further possible to grade and/or identify bonds that are of particularly low or high risk by determining the grade at both the moderate and stressed shifts of the yield curve. Grading under moderate or stressed shifts of the yield curve is represented in the matrix in Table 2 below where the WAL of a collection of bonds is graded at both moderate and stressed shifts of the yield curve. As is evident in the matrix, bonds of grade "A" identified under conditions of a moderate shift of the yield curve represent 37% of the bonds. This is also shown diagrammatically in FIG. 1 as a bar chart. However, of the "A" bonds graded under conditions of a moderate shift of the yield curve only a certain fraction also represents a grade of "A" when analyzed under conditions of a stressed shift of the yield curve. Thus the original 37% of the bonds that graded "A" under a moderate shift of the yield curve breaks down into 23% which receive a grade of "A/A" under conditions of both a moderate and stressed shift of the yield curve, 11% which fall under a grade of "A/B" and a final 3% which fall under the grade of "A/C". Thus it is evident from the matrix that using two components of WAL variability permits further stratification of CMOs thereby allowing an investor to identify bonds having the highest or lowest variability.

TABLE 2

PCNT OF BOND BY JOINT WAL1

| WAL1M | A | B | C | D | E | WAL1S |
|---|---|---|---|---|---|---|
| A | 23% | 11% | 3% | 0% | 0% | |
| B | 0% | 17% | 1% | 0% | 0% | |
| C | 0% | 1% | 9% | 2% | 0% | |
| D | 0% | 0% | 2% | 8% | 6% | |
| E | 0% | 0% | 0% | 0% | 15% | |

Advantageously, the use of two measures of weighted average life (e.g., WAL1M and WAL1S) to determine volatility provides a method of identifying securities which may not fit a traditional or conventional characterization profile. It is possible that some securities appear to have a very favorable characterization as would be reflected in low prepayment risk and low volatility of WAL at a certain yield curve shift. However by providing a classification of prepayment risk at both a moderate yield curve shift and a stressed yield curve shift, the inventive grading method is able to provide a richer and more detailed picture of the characteristics of the underlying security.

After calculation of WAL, WAL1M, and/or WAL1S, a grade may be assigned to each bond issued from an asset pool. Grades are empirically determined through cluster analysis and provide an indication of the character of the underlying security and may be comparable to the risks associated with other securities that exhibit sensitivity to interest rate change.

In another aspect of the invention, a bond may be graded by at least two components including a prepayment component (such as WAL, WAL1M and/or WAL1S described above) in combination with a complexity component. The complexity component takes into account the number of factors and/or variables that may affect the bond during origination or in the secondary market. There is no particular restriction on the types of variables and/or factors that may define the complexity component.

In one aspect of the inventive grading process, the complexity component is a function of the number of different variables and/or conditions that define the payment stream for the underlying bond. The complexity component may take into consideration various market-imposed or security specific factors which may further influence an investor's decision with respect to a specific security. The elements that may be included in the complexity calculation include the relative position of the particular bond in the principal payment structure. For example, the complexity calculation may take into account the number of any of the triggers, ratios and/or schedules that affect the payment priorities of that bond.

By using prepayment risk in conjunction with a complexity component to assign an overall grade to a bond, one aspect of the invention identifies and characterizes securities such as collateralized mortgage obligations by class into "buckets". Buckets of different classes may subsequently be valued differently in the market. Thus, the invention provides a way to subdivide seemingly similar bonds into different investment categories.

The CMO grading method of the invention includes a consideration of the complexity of the CMO as defined by factors other than, for example, the interest rate risk or the prepayment risk of the bond. The complexity component may take into account a number of elements including one or more triggers, one or more ratios and/or one or more schedules that affect the payment priorities of the particular bond. In one aspect of the invention, the elements of complexity are an integral part of the characteristics of the CMO. These elements may provide a means for taking into account different ways of splitting cash flows from a given asset pool and other measures of quality such as loan to value ratio (LTV).

A trigger may be anything that changes the existing rules of the cash flow waterfall of a bond and/or bond pool. A ratio may be used to allocate cash flow derived from prepayments to a bond or bonds, while allocating cash flows derived from amortization of principal to other bonds. A schedule may be used to allocate cash flows first to a bond or bonds until the scheduled value is reached, then to other bonds. In a further aspect of the inventive grading process, the complexity component (CPLX) may be weighted and/or multiplied by a factor to take into account a subjective weighting of complexity determined, for example, by an expert. The Freddie Mac Multiclass Certificates Offering Circular dated Jun. 1, 2003 (incorporated herein by reference in its entirety) describes collateralized mortgage obligations to which a grading method such as the methods, system and computer program product described herein may be applied and further describe, for example, the triggers, ratios, schedules, and other risk factors that may affect the prepayment or complexity components of CMOs.

In one aspect, complexity is provided with grades such as S (simple), M (moderate), and/or X (complex). In an example the grades are correlated with complexity as shown below in Table 3. Of course, the ranges for S, M and X may be different from those shown in the table below. For example, S may be any number from 0 to 5 including 0, 1, 2, 3, 4 and 5. Likewise M may be any number from 1-10 including 1, 2, 3, 4, 5, 6, 7, 8, 9, and 10. And X may be any number greater than M.

TABLE 3

| Grade | CPLX | Structures/Examples |
|---|---|---|
| S | CPLX = 0 | Simple sequential |
| M | $1 \leq CPLX \leq 3$ | Simple PAC w/ or w/o NSJ |
| X | $CPLX \geq 4$ | PAC w/ multiple NSJs |

As is evident from Table 3 above the complexity component is associated with the structure of the bond. In its simplest form, such as a bond having simple sequential principal payments, the complexity component (CPLX) may be 0 indicating no triggers, schedules or ratios. Bonds that fall into a planned amortization class (PAC) may rate a much high complexity due to the number of factors which may change the cash flow associated with the bond.

Such bonds may contain one or more principal priority changing triggers and may rate a much high complexity due to the number of factors which may change the cash flow associated with the bond. A change in cash flow that is not subsequently fixed at the new cash flow order is generically referred to as a non-sticky jump or NSJs, e.g., classes whose principal payment priorities change temporarily upon the occurrence of one or more "trigger" or other priority-changing conditions.

The grading of certain bonds may correspond well with their properties. For example in a bond that pays to a schedule (generically referred to as a PAC) the impact of collateral classified as current coupon or current discount coupon is minimal. PACs often are rated A under a moderate yield curve shift and are often graded better than B at a stressed shift of the yield curve with respect to WAL. The grade can of course depend upon the relative position of a bond within the related principal payment structure. A bond in a front position of the principal payment order may receive a higher grade. The grading may further be affected by the points at which cash flows are cut. Because a PAC or a companion support bond associated therewith may pay based on a schedule, the complexity may further affect the grade.

Because the prepayment component of a bond may be essentially independent of the complexity component, any bond having a complexity grade of S, M or X may have a prepayment grade of any extreme on the scale including A, B, C, D, and/or E.

After calculation of WAL, WAL1M, WAL1S, and complexity, a grade may be assigned to each bond issued from an asset pool. Grades are empirically determined through cluster analysis and provide an indication of the character of the underlying security and may be comparable to the risks associated with other securities that exhibit sensitivity to interest rate change.

Certain observations with respect to bond structure and grading may be made. NSJ bonds (bonds having priority shifting triggers that are tested every payment period) may be graded lower on the A-E scale than bonds with priority shifting triggers that permanently shift payment priorities upon occurrence of the applicable trigger event. This may be a reflection of the risk associated with a shift in priority among recipients of cash flows or principal flows associated with the bond. In an NSJ bond, one party may have a superior right to payment above another class. However, the superiority is not permanently set and may change. This variability may then be reflected in the grade of the bond.

NSJ bonds may be graded, for example, "C" or lower at both moderate and stressed shifts of the yield curve. NSJ bonds paying according to a schedule or TAC may indicate a higher grade such as "A" or "B" under moderate shifts of the yield curve but under stressed shifts may fall to lower grades such as "C". The presence of support bonds may further affect the relative grade of the NSJ bond.

The complexity associated with NSJ bonds may result in either an improvement or degradation of the bond's grade. The complexity of a certain bond may lessen prepayment risk in one class while a different class may suffer from a greater risk of prepayment due to the complexity. For example, complexity may increase prepayment risk for TAC bonds whereas the prepayment risk for Accrual bonds may be lowered by complexity.

Figure 2:
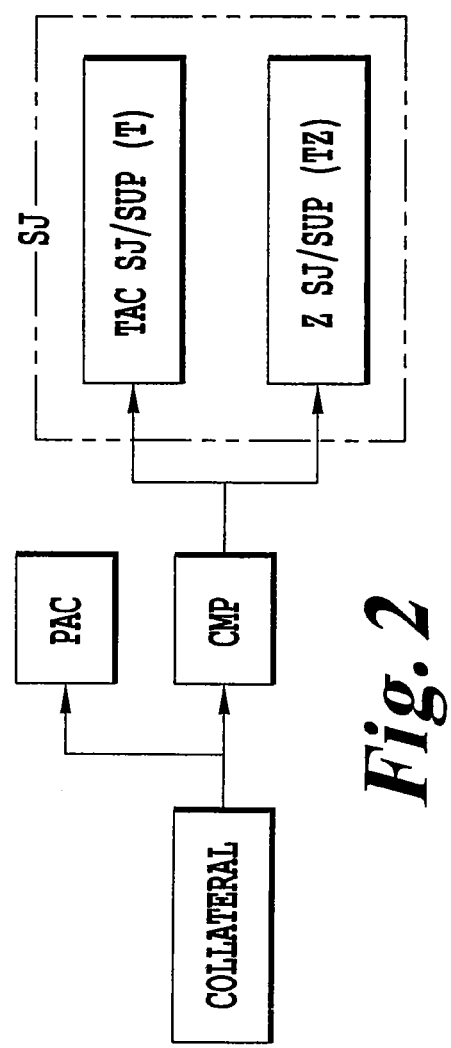
FIG. 2 is a block diagram of a generic principal payment structure.

A sticky jump structure (SJ) differs from the NSJ structure in that no change in class superiority occurs once the priority changing trigger event occurs. A generic SJ structure is presented as FIG. 2. Substantial differences in WAL according to the Bloomberg median prepayment speed at a 0 shift and stochastic WAL calculation are evident. It is possible that the PSA speed does not fully take into account expected risk associated with prepayment or extension of payment. The grading method of the invention may effectively capture maximum WAL variants and may therefore include this effect in the ultimate grade assigned to a particular bond.

Non-accelerated securities (NAS/AS bond structures) may have a grade that is dependent upon the relative percentage of the non-accelerated bond in the total accelerated and non-accelerated bond structure. The interest rate environment and prepayment assumptions may have a lesser effect upon the actual grade of the bond. An NAS is often graded as "B" in both moderate and stressed shifts of the yield curve with lower quality (e.g., greater volatility) associated with an increasing percentage of the NAS (e.g., grades moving from A/B to B/C). An accelerated securities bond (AS) may show more sensitivity to grading based upon the bond structure. When the percentage of AS bonds in a structure is less than approximately 15%, grades of "B" may be obtained for both moderate and stressed shifts of the yield curve. Between approximately 15% and 60% of AS bonds in a structure, the grade may fall into the range of "C"-"E". Structures with percentages of AS above 60% may then again converge towards the "B"-"C" range.

EXAMPLES

Example 1

FHR 2758 Group 1

The series 2758 group 1 bonds were graded by WAL, WAL1M, WAL1S and CMPLX as described herein. The grades of different bonds within the offering are shown in Table 4 below.

TABLE 4

| | | |
|---|---|---|
| PAC | FL (4.5, A, B) (1) | KA (0.6, A, A) (M) |
| | | KH (2.8, A, A) (M) |
| | | KC (4.6, A, B) (M) |
| | | KD (5.5, B, B) (M) |
| | | KE (7.8, B, B) (M) |
| | KV (9.1, A, B) (M) | |
| | KZ (15.6, B, B) (M) | |

The front end bonds KA, FL and KV were all graded "A" under moderate and stressed shifts of the yield curve. Complexity is the same for all bonds in the structure because each bond has the same number of the triggers, schedules, etc. that are a part of the total offering. The middle bond FL was further divided into tranches KH, KC, KD, and KE. As one moves from the front of the aggregate (i.e., KH) the grading decreases from "A" to "B" for both moderate and stressed shifts of the yield curve.

Example 2

FHR 2764 Group 4

Figure 3:
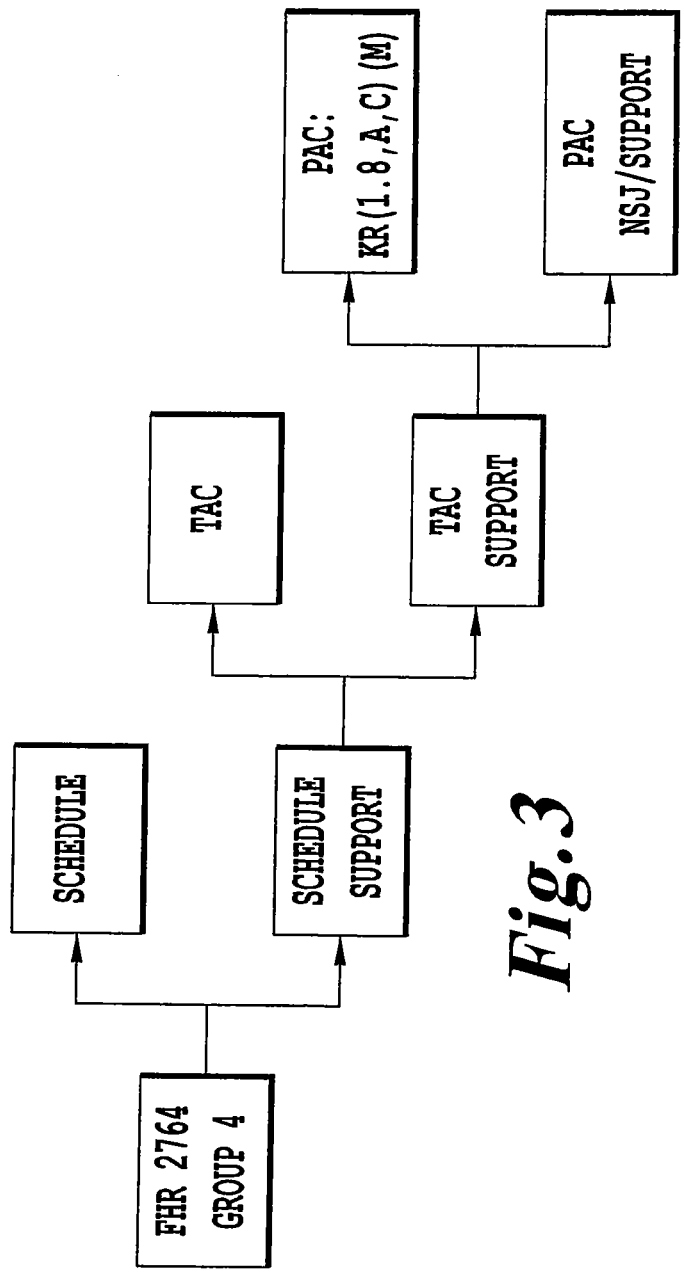
FIG. 3 shows a simplified structure of a FHR 2764 Group 4 offering.

The structure of this offering is provided as FIG. 3. The principal payments may be sliced according to the type of bond involved such as schedule, TAC and PAC, and NSJ. In the FHR 2764 Group 4 offering the bond KR is a PAC bond which grades "A" under a moderate shift of the yield curve and grades a "C" under a stressed shift of the yield curve. In this particular series, cash flow is cut at the third tier. The cash flow cut is reflected in the variability under stressed shifts of the yield curve and therefore the bond is graded substantially lower (i.e., "C"). The complexity is graded "M" to reflect the inclusion of the cash flow cut of the bond schedule.

Example 3

FHR 2759 Group 1

Figure 4:
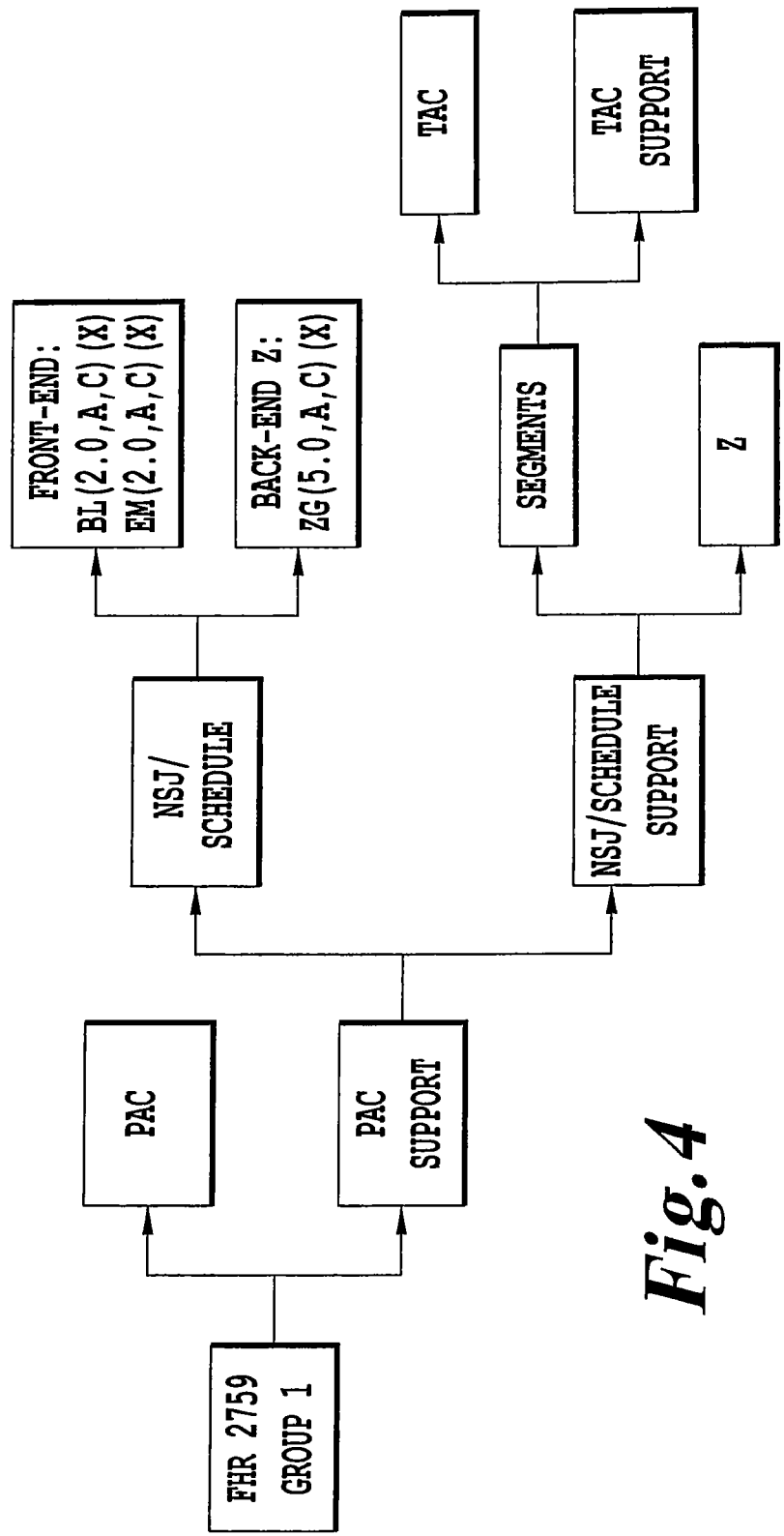
FIG. 4 shows a simplified structure of a FHR 2759 Group 1 offering.

The structure of this offering is presented in a simplified form as FIG. 4. Different grades for the NSJ/scheduled bonds are shown for both front-end and back-end bonds. The NSJ bonds grade as "A" under moderate shifts of the yield curve for both front-end and back-end (i.e., Z) bonds. The risk of the jump is reflected in a much lower grade of "C" under a stressed shift of the yield curve. The complexity is graded as X to reflect the effects of schedules and triggers.

Example 4

Comparison of FHR 2762 and FHR 2764

Figure 5:
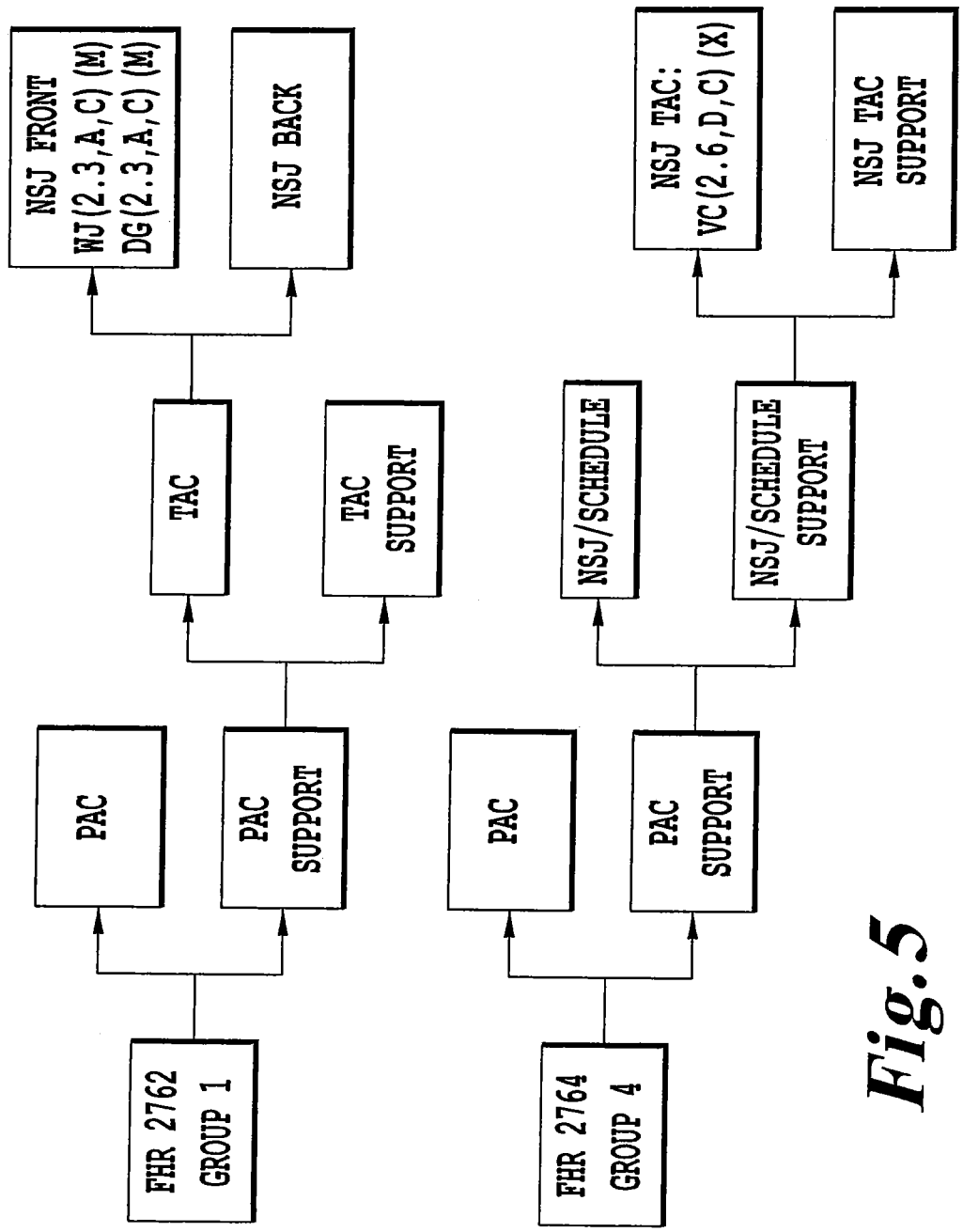
FIG. 5 shows simplified structures of offerings for FHR 2762 and FHR 2764.

FIG. 5 presents a simplified structure of each of the FHR 2762 offering and the FHR 2764 offering. Bonds WJ and DG from FHR 2762 Group 1 and bond VC from FHR 2764 Group 6 are each NSJ/TAC bonds having WAL 2.3, 2.3 and 2.6, respectively. Grading of these bonds under a moderate shift of the yield curve provides an "A" for WJ and DG whereas VC is graded "D" under a moderate shift of the yield curve. The difference in grading may be explained by the levels of support and relative position of the bonds in the payment structure. WJ and DG are a part of the companion bonds which support the PAC class. However VC is part of the support bonds which support the scheduled bonds and the scheduled bonds themselves are a part of companion bonds which support the PAC class. Therefore, the VC class is one layer lower than the WJ and DG classes and therefore may be subject to significantly greater risk due to its lower payment priority in the payment structure.

Example 5

FHR 2778 Group 1 (REMIC with Two Combined NSJ/Scheduled Bonds)

Group 1 of the FHR 2778 offering includes a NSJ schedule that was created by combining a 3.5% and 18% CPR prepayment trigger. The standard WAL disclosure tables of the offering circular supplement for this series do not show the WAL "jump" for some of the NSJ bonds. Thus, the complete risk associated with each class of bonds may not be readily apparent to the investor.

Using the inventive grading method, combined with a Bloomberg median prepayment speed assumption, the cash flow risks for all the NSJ bonds of this series may be identified and quantified. FIG. 6 provides information for a number of bonds of this series. Each of classes ZC, FR, FY, PO, SB, SQ, ZY, CZ, LF, LS, and WZ, show significant extension risk although they have a low WAL (e.g., 0 interest rate shift according to the offering circular). A collateral profile report for the FHR 2778 offering is provided as FIG. 7. The risk that may not be fully transparent in the offering circular is now evident in the low grades associated with these REMIC classes as shown in FIG. 6. Thus the grading method of the invention is able to provide an improved reflection of prepayment risk in comparison to the prepayment speed assumption provided by the dealer that structured this series (i.e., 220 PSA) or the Bloomberg median consensus (i.e., 311 PSA).

Example 6

FHR 2524 Group 5 NAS/AS Structure

Figure 8:
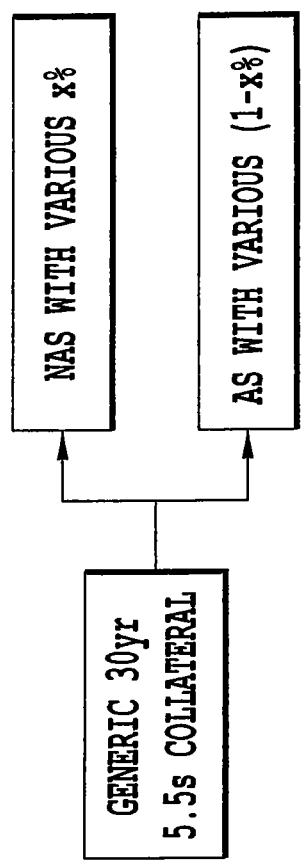
FIG. 8 shows a simplified and generic structure of FHR 2524 Group 5.

A simplified diagram of the structure of this offering is shown as FIG. 8. This structure includes provisions that allow the percentage of NAS bonds in the structure to change in the range from 15% to 95%. Collateral for this series consists of 30 year mortgages carrying an interest rate of 5.5% per annum with a calculated WAL of 4.75, WAL1M of 77 and WAL1S of 33. Thus, the prepayment and complexity grade of the assets for this series is [4.75, B, B] (M). The change in grade as the relative NAS/AS ratio changes is shown in Table 5 below.

TABLE 5

| | | NAS Grade | | | AS Grade | | |
|---|---|---|---|---|---|---|---|
| NAS % | AS % | WAL | WAL1M | WAL1S | WAL | WAL1M | WAL1S |
| 15% | 85% | 4.45 | 40 A | 18 B | 4.81 | 83 C | 35 C |
| 25% | 75% | 5.10 | 49 A | 22 B | 4.64 | 87 C | 37 C |
| 35% | 65% | 5.24 | 50 B | 22 B | 4.49 | 94 C | 40 C |
| 45% | 55% | 5.55 | 52 B | 22 B | 4.10 | 105 C | 45 C |
| 55% | 45% | 6.52 | 47 A | 20 B | 2.59 | 169 D | 74 D |
| 65% | 35% | 6.27 | 52 B | 21 B | 1.94 | 229 D | 102 E |
| 75% | 25% | 5.82 | 66 B | 25 B | 1.54 | 205 D | 123 E |
| 85% | 15% | 5.39 | 77 B | 32 B | 1.16 | 68 B | 60 C |
| 95% | 5% | 4.97 | 77 B | 33 B | 0.64 | 67 B | 30 B |

Figure 9:
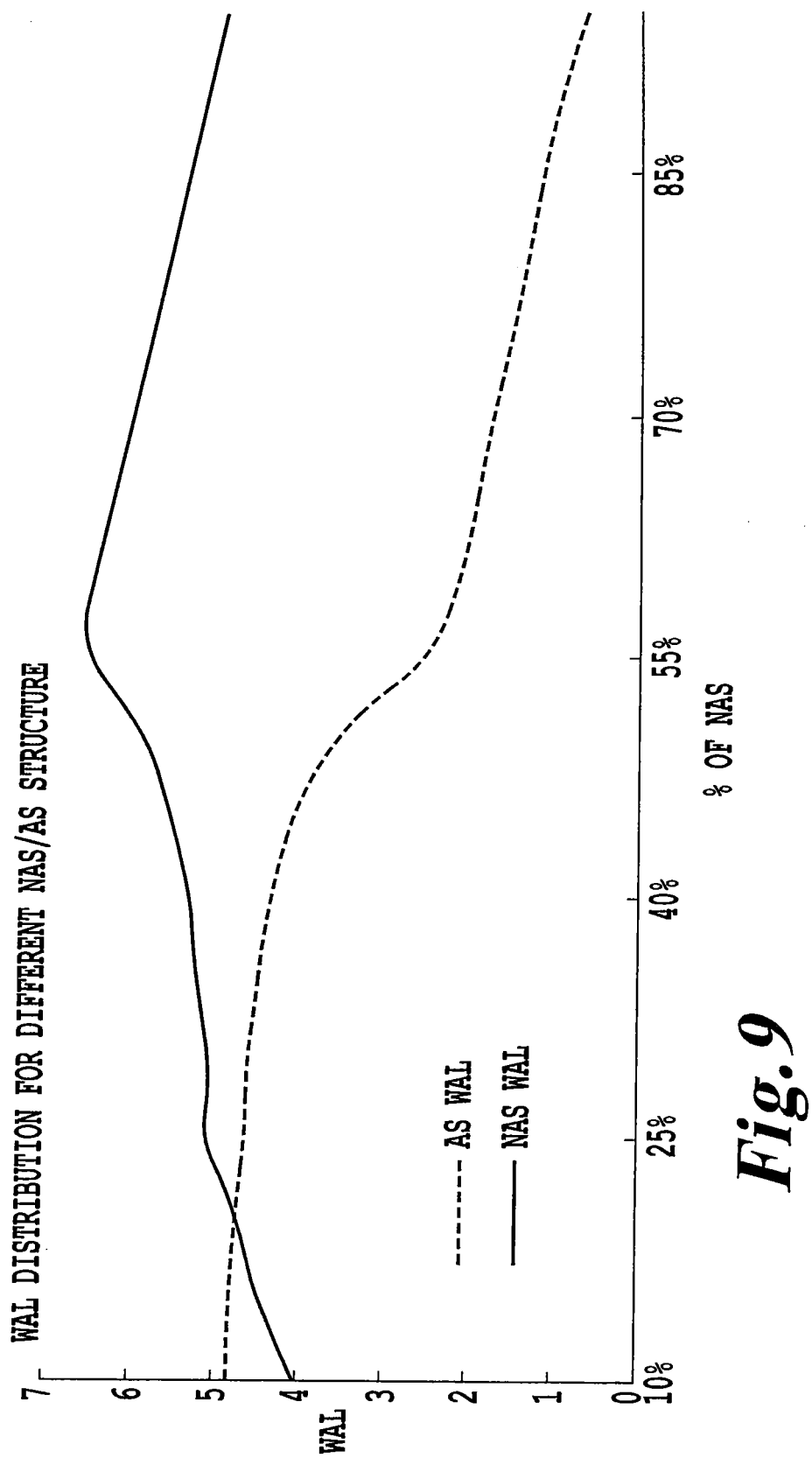
FIG. 9 shows the WAL distribution for different relative ratios of NAS (non-accelerated securities) and companion AS (accelerated securities) principal payment structures.
Figure 10:
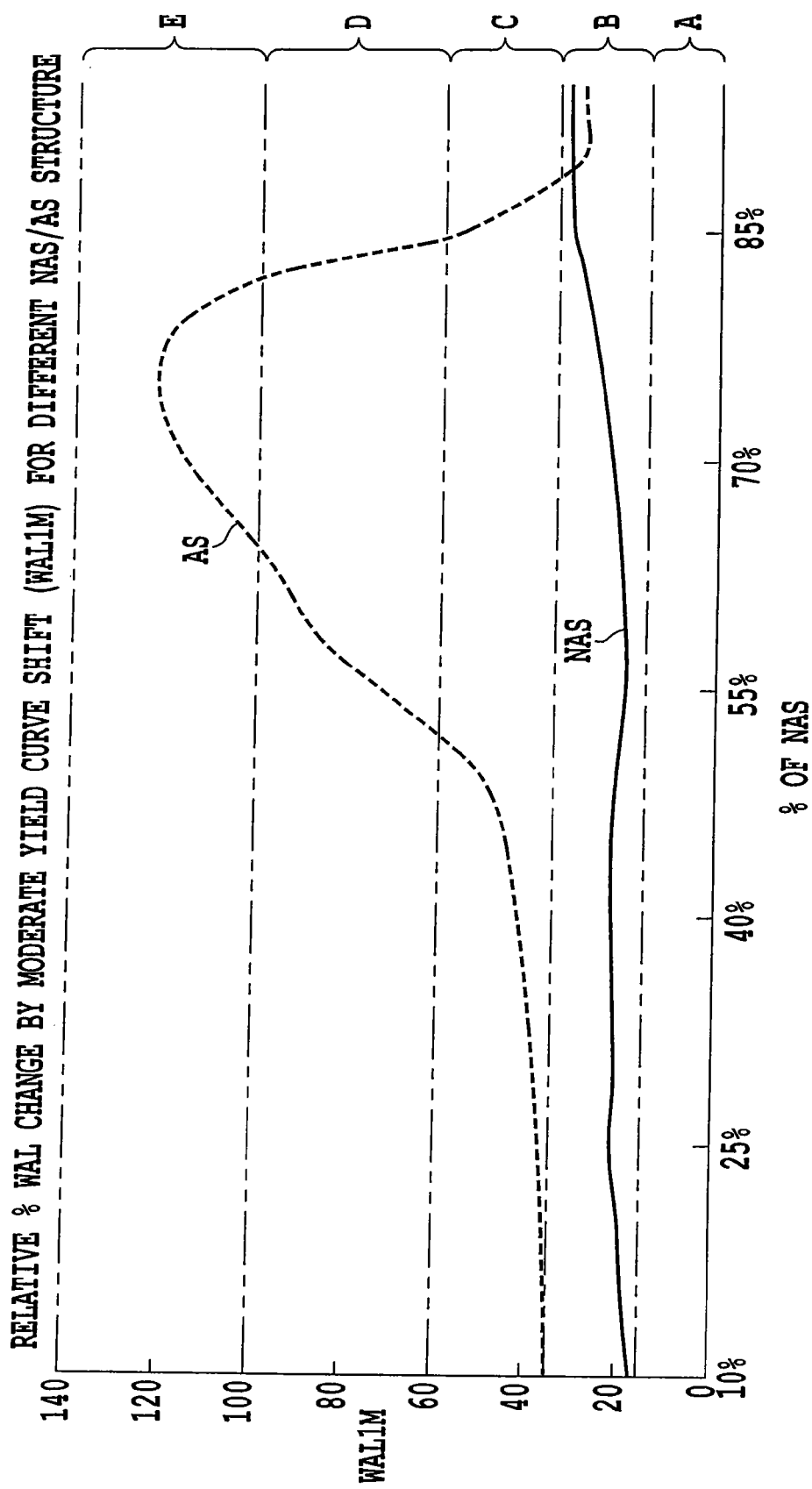
FIG. 10 shows the change in grading of the NAS and AS components as a function of the NAS/AS ratio.
Figure 11:
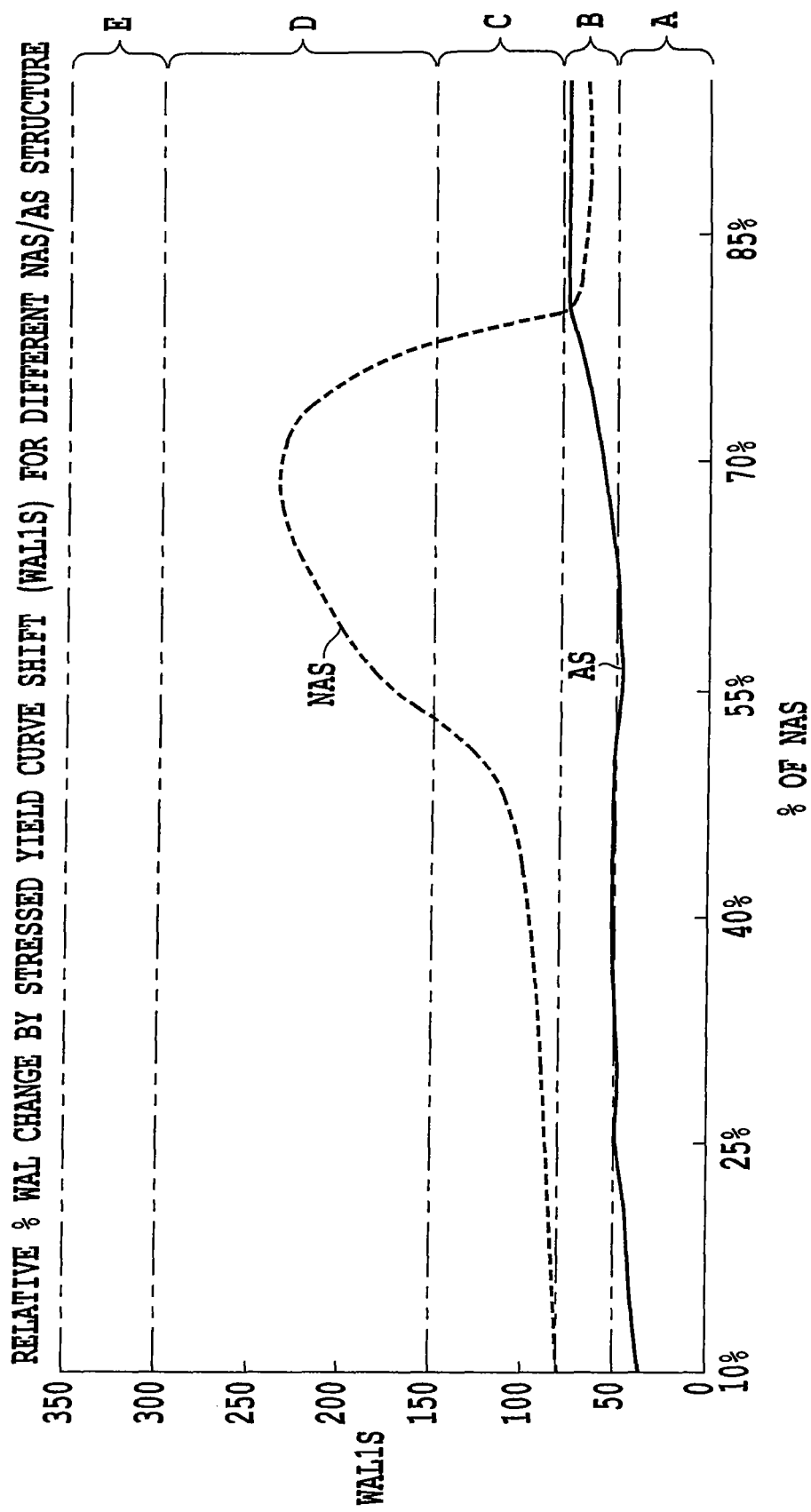
FIG. 11 shows the change in grading under a stressed yield curve shift of the NAS component relative to the NAS/AS ratio.

The data of the table may also be represented as a continuum as shown in FIG. 9. FIGS. 10 and 11 provide a graphical description of the grade of certain relative ratios of NAS/AS as a function of moderate and stressed shifts of the yield curve, respectively.

The inventive method for determining sensitivities of WAL and the grading method of the invention (e.g., a CMO grading method) may be carried out on a computer-based system. The computer-based system may be accessed remotely or may be installed on a mobile device carried with an individual, such as a personal digital assistant (PDA). The grading methods of the invention (e.g., methods for calculating WAL sensitivity and grading CMOs) may be carried out by an individual or may be carried out by a plurality of individuals internet-worked over a computer system.

FIG. 12 illustrates a computer system 1201 upon which an aspect of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative aspects, hard-wired circuitry may be used in place of or in combination with software instructions. Thus, aspects are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer-implemented method for assessing a prepayment risk for an asset-backed security, comprising the steps of:
   determining a weighted average life of the asset-backed security,
   determining a weighted average life of the asset-backed security at a moderate shift in the yield curve;

determining a weighted average life of the asset-backed security at a stressed shift in the yield curve; and ranking the asset-backed security against other asset-backed security to obtain a relative rank of prepayment risk based on weighted average life, weighted average life at a moderate shift in the yield curve, and weighted average life at a stressed shift in the yield curve;

wherein at least one of the determining steps and the ranking step is performed on a processor of a computer.

2. The computer-implemented method of claim 1, wherein
the weighted average life of the asset-backed security at a moderate shift in the yield curve is calculated from the weighted average life at a yield curve shift of from 50 to 150 bps, and the weighted average life of the asset-backed security at a stressed shift in the yield curve is calculated from the weighted average life at a yield curve shift of from 100 to 500 bps.

3. The computer-implemented method of claim 1, further comprising:

assigning a prepayment risk grade to the asset-backed security based on the weighted average lives at moderate and stressed shifts in the yield curve.

4. The computer-implemented method of claim 1, wherein the weighted average lives are determined without reference to the price of the asset-backed security.

5. The computer-implemented method of claim 1, further comprising:

determining a volatility of the weighted average life of the asset-backed security at the moderate shift in the yield curve; and determining a volatility of the weighted average life of the asset-backed security at the stressed shift in the yield curve.

6. A computer program product including instructions encoded on a computer-readable medium and configured to enable a processor to perform a method for assessing prepayment risk for an asset-backed security, comprising the steps of:

determining a weighted average life of the asset-backed security, determining a weighted average life of the asset-backed security at a moderate shift in the yield curve;

determining a weighted average life of the asset-backed security at a stressed shift in the yield curve; and ranking the asset-backed security against other asset-backed security to obtain a relative rank of prepayment risk based on weighted average life, weighted average life at a moderate shift in the yield curve, and weighted average life at a stressed shift in the yield curve.

7. The computer program product of claim 6, wherein the weighted average life of the asset-backed security at a moderate shift in the yield curve is calculated from the weighted average life at a yield curve shift of from 50 to 150 bps, and the weighted average life of the asset-backed security at a stressed shift in the yield curve is calculated from the weighted average life at a yield curve shift of from 100 to 500 bps.

8. The computer program product of claim 6, further comprising the step of:

assigning a prepayment risk code to the asset-backed security based on weighted average lives at moderate and stressed shifts in the yield curve.

9. The computer program product of claim 6, wherein:
the weighted average lives are determined independently of the price of the asset-backed security.

10. A system for assessing a prepayment risk for an asset-backed security, comprising:

means for determining a weighted average life of the asset-backed security;

means for determining a weighted average life of the asset-backed security at a moderate shift in the yield curve; and means for determining a weighted average life of the asset-backed security at a stressed shift in the yield curve.

11. The system of claim 10, wherein the system is computer-implemented.

12. A system for assessing a prepayment risk for an asset-backed security, comprising: a calculation mechanism configured to determine a weighted average life of the asset-backed security;

a calculation mechanism configured to determine a weighted average life of the asset-backed security at a moderate shift in the yield curve; and a calculation mechanism configured to determine a weighted average life of the asset-backed security at a stressed shift in the yield curve.

13. A method for assessing a prepayment risk for an asset-backed security, comprising:

determining a weighted average life of the asset-backed security, determining a weighted average life of the asset-backed security at a moderate shift in the yield curve; and determining a weighted average life of the asset-backed security at a stressed shift in the yield curve;

wherein at least one of the determining steps is carried out on a processor of a computer.

14. The method of claim 13, wherein
the weighted average life at the moderate shift in the yield curve is calculated from the weighted average life at a yield curve shift of from 50 to 150 bps, and the weighted average life of the stressed shift of the yield curve is calculated from the weighted average life at a yield curve shift of from 100 to 500 bps.

15. The method of claim 13, wherein each of the weighted average lives are determined without reference to the price of the asset-backed security.

16. A system for assessing a prepayment risk for an asset-backed security, comprising:

means for determining a weighted average life of the asset-backed security;

means for determining a weighted average life of the asset-backed security at a moderate shift in the yield curve; and means for determining a weighted average life of the asset-backed security at a stressed shift in the yield curve; and means for ranking the asset-backed security against another asset-backed security to obtain a relative rank of prepayment risk based on weighted average life, weighted average life at a moderate shift in the yield curve, and a weighted average life at a stressed shift in the yield curve.

17. The system of claim 16, wherein the system is computer-implemented.

18. A system for assessing a prepayment risk for an asset-backed security, comprising: a calculation mechanism configured to determine a weighted average life of the asset-backed security;

a calculation mechanism configured to determine a weighted average life of the asset-backed security at a moderate shift in the yield curve; and a calculation mechanism configured to determine a weighted average life of the asset-backed security at a stressed shift in the yield curve; and a calculation mechanism configured to rank the asset-backed security against another asset-backed security to obtain a relative rank of prepayment risk based on weighted average life, weighted average life at a moderate shift in the yield curve, and a weighted average life at a stressed shift in the yield curve.

* * * * *